United States Patent [19]

Verchere

[11] 4,110,873
[45] Sep. 5, 1978

[54] COUPLING

[76] Inventor: Maurice Verchere, 1, rue de la Bretouze, 01103 Oyonnax, France

[21] Appl. No.: 771,584

[22] Filed: Feb. 24, 1977

[30] Foreign Application Priority Data

Mar. 31, 1976 [FR] France .................................. 76 09401

[51] Int. Cl.² ........................ A44B 17/00; A44B 11/25
[52] U.S. Cl. .................................................. 24/230 R
[58] Field of Search ...................................... 24/230 R

[56] References Cited

U.S. PATENT DOCUMENTS

| 2,166,902 | 7/1939 | Freysinger | 24/230 R |
| 3,167,835 | 2/1965 | Bengtsson | 24/230 R |
| 3,181,189 | 5/1965 | Leyden | 24/230 R |
| 3,234,615 | 2/1966 | Martinez | 24/230 R |
| 4,001,924 | 1/1977 | Bengtsson | 24/230 R |
| 4,023,435 | 5/1977 | LaDue | 24/230 R |

FOREIGN PATENT DOCUMENTS 730,372  8/1932  France .................... 24/230 R

*Primary Examiner*—Bernard A. Gelak
*Attorney, Agent, or Firm*—Beveridge, DeGrandi, Kline & Lunsford

[57] ABSTRACT

A releasable coupling comprises a female component providing an open ended sleeve and a male component having a projection for insertion into this sleeve, said projection comprising an enlarged hook formation or detent connected by thinner resilient connecting members to the body of the male part. The form of the components is such that said projection can be inserted through said sleeve, the hook formation, on emerging from the end of the sleeve opposite that from which it was inserted springing resiliently, due to said connecting members, in a transverse direction perpendicular to the insertion direction to bring an abutment face on the hook formation into opposition with an abutment at the end of the sleeve opposite the end from which the said projection was inserted so that the components can thereafter be uncoupled only after displacing the hook formation in the direction opposite to said transverse direction.

The projection on the male component also includes a lug, independent of the resilient connecting members, which fits in the sleeve when the components are fully coupled and prevents gross transverse movement of the male component as whole relative to the female component when the components are fully coupled thus ensuring that only deliberate resilient displacement of the locking formation relative to the other parts of the coupling can make disconnection of the components possible.

5 Claims, 4 Drawing Figures

COUPLING

This invention relates to a releasable coupling suitable, for example, for use with clothes (e.g. in supporting straps for trousers), or for securing detachable tanks to vehicles, or for closures for bags or cases.

Some known couplings of this kind comprise a female component formed with a sleeve, socket, bush or the like open at its two ends so as to form a passage for a resilient hook secured to a male component. In the locked position, the lug or free end of the hook extends completely through the sleeve and projects therefrom, cooperating with a flange on the sleeve so as to secure the two parts of the article in the desired manner.

The male and female components can be secured to the two parts by any suitable means. One simple method which can be used for this purpose is to provide transverse slots in the securing portions of the male and female components, the slots being adapted to cooperate with straps attached to the parts to be connected. This has the additional advantage that the position of at least one male or female component can be adjusted as required with respect to one of the parts to be connected.

A known coupling device of this kind, disclosed in French Patent Specification No. 1,298,002, comprises a male component formed with two resilient hooks separated by a longitudinal slot, the hook cooperating with the lateral surfaces of the sleeve when in the locked position. In order to separate the two components of the coupling device, it is necessary to move the two hooks towards one another by transverse pressure on their end parts projecting from the sleeve. Such action is difficult, since the free ends of the two hooks project very slightly and thus offer little purchase to the transverse unlocking action.

In another known device of the same kind, disclosed in French Patent Specification No. 1,373,312, the male component comprises a central locking projection and two lateral guide lugs. It is opened by acting on the projection in a plane perpendicular to the plane of the coupling device, the lateral lugs having a guiding effect when inserted into the female component and also, owing to their thickness, preventing the device from pivoting.

It is an object of the invention to provide an improved releasable coupling which is readily uncoupled when desired whilst being secure against accidental coupling.

According to the invention, there is provided a coupling comprising a female component and a male component releasably connectable to the female component, the male component comprising a body part and a projection extending from said body part, and the female component having means defining a passage having an open end to receive said projection, said projection comprising a hook formation remote from said body part and resilient connecting means connecting said hook formation with said body part, said hook formation having an abutment surface facing towards said body part and said female component having an abutment surface facing away from said open end of said passage, the dimensions and configurations of the male and female parts being complementary whereby the projection of the male component can be inserted in the passage of the female component, as far as an inserted position in which said abutment surface of the hook formation faces said abutment surface of the female component to abut therewith for preventing withdrawal of the male component from said passage, said projection further comprising a lug extending from said body part and fitting within said passage in said inserted position to limit movement of said projection within said passage in a direction perpendicular to the direction of insertion, said resilient connecting means permitting resilient movement of said hook formation in said direction perpendicular to the direction of insertion, whereby, in the inserted position said hook formation can be resiliently displaced out of register with the abutment surface on the female component to allow withdrawal of the projection from said passage and whereby, during insertion, the hook formation can be resiliently displaced relative to said lug to allow the latter to enter said passage, before the hook formation springs into place behind said abutment on the female component.

In order to prevent any pivoting of the male component with respect to the female component, the thickness of the lug is substantially equal to the corresponding dimension of said passage of the female component. Advantageously the end of the lug is bevelled to facilitate introduction into the passage.

In a preferred embodiment, two projecting lugs, having the same structure and interconnected by a crossmember, are disposed between resilient connecting means in the form of two transversely spaced members, to prevent any pivoting of the male component with respect to the female component.

In this preferred embodiment, the two transversely spaced members are inclined to the direction of insertion of the projection on the male part into the passage of the female part, and the last mentioned passage tapers accordingly. This facilitates the guidance of the male component inside the female component when the projection is inserted.

An embodiment of the invention described is below, by way of non-limitative example, with reference to the accompanying drawings, in which.

In the description which follows, words such as front, rear, top, bottom etc. are used as if the coupling had a particular orientation in space. However, it will be appreciated that such terminology is used for convenience, and its use should not be taken to mean that the invention is restricted to any particular orientation of the coupling, or that the coupling is in any way dependent on gravity, for its proper functioning.

Figure 2:
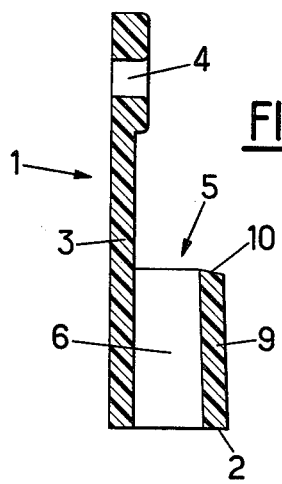
FIG. 2 is a view in vertical section, perpendicular to the plane of FIG. 1 of the female component of the coupling of FIG. 1.

The coupling shown in the drawings comprises a female component 1 and a male component 2. The female component 1 has a transverse slot 4 in a generally planar base part 3 near its upper end, to receive a flexible strap attached e.g. to a garment. Near its lower end the component 1 has a sleeve 5 partly formed by part of the base part 3, partly formed by a planar wall 9 generally parallel with and spaced in front of the base part 3, and partly formed by two side walls connecting the wall 9 with the part 3. This sleeve 5 defines therein a passage 6, of rectangular shape in horizontal section, said side walls being inclined towards each other upwardly so that the opening 7 at the lower end of the female component is wider than the opening 8 at the upper end of the passage 6. Whilst, for an understanding of the operation of the coupling, the wall 9 may be regarded as parallel with planar part 3, in practice, in order to facilitate manufacture by moulding, the wall 9 is inclined slightly toward the part 3 in the upward direction. The top of the wall 9 provides an abutment face 10, which is advantageously inclined to the horizontal so that, as shown in FIG. 2, the face 10 meets the rear, inner surface of wall 9 at an acute angle.

The female component 1 can be made entirely or partly of metal or entirely or partly of rigid plastics.

Figure 1:
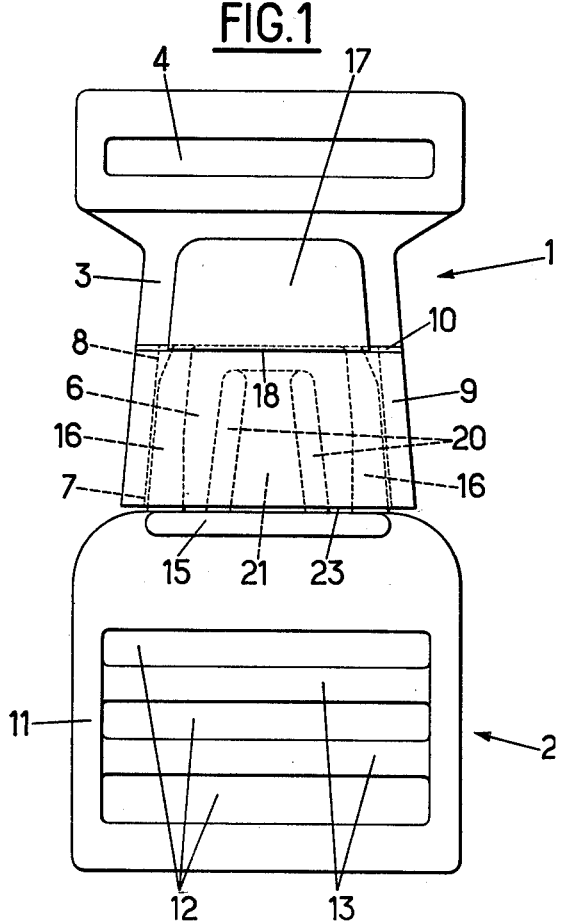
FIG. 1 is a front elevation view of a coupling embodying the invention, in the state in which the two components of the coupling are fully coupled.
Figure 4:
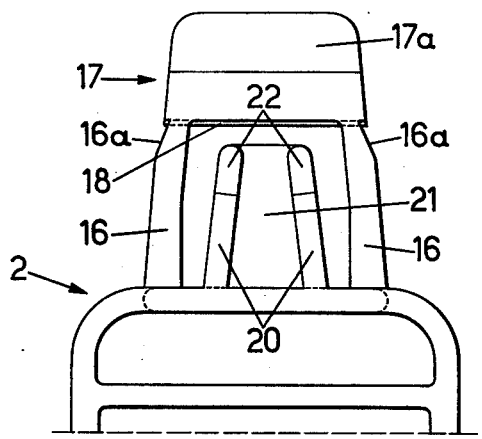
FIG. 4 is a partial rear elevation view of the male component of the coupling of FIG. 1.

The male component 2 has a lower part 11 formed with three transverse slots 12 bounded by cross-members 13 disposed in different vertical planes so as to facilitate securing and adjusting a strap secured to the other part of the article. The lower part 11 is separated from an upper part 14 by a transverse horizontal flange 15 extending substantially all the way across the male component 2, the flange 15 projecting forwards from the plane 11a in which lie the forwardmost parts of the lower part 11 of component 2. The upper part 14 of component 2 has two lateral uprights 16 which are inclined slightly towards each other in the upward direction so that their outer surfaces can cooperate with the inner surfaces of the side walls of sleeve 5, as shown in FIG. 1. At their upper ends, uprights 16 carry a hook formation in the form of a lug 17 formed with an abutment face 18 adapted to cooperate, as shown in FIG. 1, with the inclined abutment face 10. In order to facilitate guidance of the male component in sleeve 5 when hook 17 is inserted therein, each upright 16, as shown in FIGS. 1 and 4, has at its upper end, a slightly set-back part 16a, the rear edge of lug 17 projecting slightly to the side relative to part 16a, as shown inter alia in FIG. 4. As shown in FIG. 1, lug 17 which projects from sleeve 5 in the locked position, has a width substantially equal to the minimum width of the passage formed by the lug and corresponding to the width of aperture 8. On the side facing the planar part 3 of the female component 1, the free end of lug 17 has a bevelled surface 17a, this bevelling providing adequate clearance for movement of the formation 17 towards the part 3, relative to the body part of the male component, during insertion of the male component into the female component and during unlocking of the coupling. Such movement of formation 17 is, of course, permitted by the resilience of uprights 16.

Figure 3:
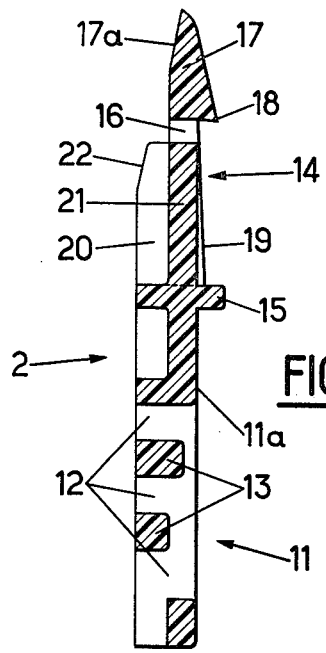
FIG. 3 is a view in vertical section perpendicular to the plane of FIG. 1 of the male component of the coupling of FIG. 1.

In the locked position, the forwardly facing surfaces 19 of the lateral uprights 16 come into contact with the inner surface of wall 9 of sleeve 5. To prevent accidental unlocking, the upper part 14 of the male component has two lugs 20 projecting upwardly from its lower part 11 and disposed between the lateral uprights 16. The two lugs are in the form of ribs interconnected by a spacer 21 in the same plane as the top plane 11a of the male component. Of course, in different embodiments, member 21 could be in a different plane, the important feature being that it ensures that the projecting lugs 20 are sufficiently rigid. Likewise, of course, the two lugs 20 could be replaced by a single central lug. The two projecting lugs 20 are extended in respective planes substantially perpendicular to the base plane of the male component 2, as shown in FIG. 3. The two lugs 20, the bases of which are secured to the lower part 11 of male component 2, engage in the passage 6 of sleeve 5 in the fully coupled state of the coupling as shown in FIG. 1. The vertical length of ribs 20 is slightly less than the vertical length of passage 6, i.e. the length of the lateral uprights 16, so as not to interfere with the securing of lug 17. For manufacturing reasons, as shown in FIG. 4, ribs 20 are slightly inclined to the general direction in which hook 17 is introduced. Near its free end, each rib 20 has a bevelled surface 22 facilitating introduction of rib 20 and of hook 17 into passage 6.

As shown in FIG. 1, the length of uprights 16 from their base, which is secured to the lower part 11, to the top 18 of hook 17 is substantially equal to the total length of sleeve 5, so that the bottom face 23 of wall 9 component 1 cooperates with the upper surface of flange 15 of the male component when in the locked position, as shown in FIG. 1. The presence of the two projecting lugs or ribs 20, the thickness of which measured perpendicular to the plane of FIG. 1 is such that they occupy substantially all the depth, also measured perpendicular to the plane of FIG. 1, of the passage 6 when in the locked position, prevents any pivoting of the male component with respect to the female component, when in the locked position, in a direction perpendicular to the general base plane of the coupling device, ie the plane of FIG. 1, since this might result in accidental release of the coupling. Pivoting in the base plane of the device is also prevented by the transverse flange 15 and the abutment face 18 of hook formation 17, since the last-mentioned parts of the male component abut the extreme edges of the front wall 9 of sleeve 5.

The male component, like the female component, can be made partly or entirely of metal or of plastics having sufficient rigidity for easy engagement of lug 17 into sleeve 5.

Of course, if the parts of the article to be coupled are themselves made of plastics, which may be the case when the article is a box and lid, the two securing components of the device according to the invention may advantageously be moulded in one piece with either part of the article. If it is required to ensure tamper-proof closure of the device according to the invention, e.g. for travel bags or for the tanks of vehicles containing substances on which customs duty is to be paid, hook 17 can be formed with an aperture through which a securing means can extend, e.g. a cable or a padlocked rod.

What I claim is:

1. A coupling comprising a female component and a male component releasably connectable to the female component, the male component comprising a body part and a projection extending from said body part, and the female component having means defining a passage having an open end to receive said projections and inclined side walls, said projection comprising a hook formation remote from said body part and resilient connecting means connecting said hook formation with said body part, said resilient connecting means comprising two lateral uprights slightly inclined toward each other so that their outer surfaces can cooperate with the inner surfaces of said passage of the female component for guiding said hook formation during insertion and connected at their upper ends by said hook formation whereby any lateral pivoting of the male component is prevented with respect to the female component, said hook formation having an abutment surface facing towards said body part and said female component having an abutment surface facing away from said open end of said passage, the dimensions and configuration of the male and female parts being complementary whereby the projection of the male component can be inserted in the passage of the female component, as far as an inserted position in which said abutment surface of the hook formation faces said abutment surface of the female component to abut therewith for preventing withdrawal of the male component from said passage; said projection further comprising at least one rigid lug projecting from said body part and located between said two lateral uprights, the thickness of the lug in the direction perpendicular to the direction of insertion being substantially equal to the dimension of the said passage in the same direction, so that in the inserted position, the lug engaged in the passage prevents any pivoting of the male component with respect to the female component in a direction perpendicular to the direction of insertion, said resilient conneting means permitting resilient movement of said hook formation in said direction perpendicular to the direction of insertion, whereby, in the inserted position, said hook formation can be resiliently displaced out of register with the abutment surface on the famale component to allow withdrawal of the projection from said passage and whereby, during insertion, the hook formation can be resiliently displaced relative to said lug to allow the latter to enter said passage, before the hook formation springs into place behind said abutment on the female component.

2. The coupling of claim 1, in which the end of the lug is bevelled to facilitate insertion into the sleeve.

3. The coupling of claim 1 comprising two said lugs of similar structure interconnected by a cross-member, and said two lugs and said cross-member being disposed between the two resilient connecting members.

4. The coupling of claim 1, in which the hook formation has a width substantially equal to the minimum width of said passage.

5. The coupling of claim 1, in which said hook formation is bevelled to facilitate release of the coupling.

* * * * *